(12) United States Patent
Lin (10) Patent No.: US 12,284,447 B2
(45) Date of Patent: Apr. 22, 2025

(54) METHOD AND APPARATUS FOR NORMALIZING AN IMAGE IN AN IMAGE CAPTURING DEVICE

(71) Applicant: Advanced Micro Devices, Inc., Santa Clara, CA (US)

(72) Inventor: Chang-Chiang Lin, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/988,220

(22) Filed: Nov. 16, 2022

(65) Prior Publication Data

US 2024/0163564 A1 May 16, 2024

(51) Int. Cl.
*H04N 23/72* (2023.01)
*G06V 40/16* (2022.01)
*H04N 23/73* (2023.01)

(52) U.S. Cl.
CPC ........... *H04N 23/72* (2023.01); *G06V 40/161* (2022.01); *H04N 23/73* (2023.01)

(58) Field of Classification Search
CPC ....... H04N 23/72; H04N 23/73; G06V 40/161
See application file for complete search history.

(56) References Cited

U.S. PATENT DOCUMENTS

| | | | | |
|---|---|---|---|---|
| 7,551,755 | B1 * | 6/2009 | Steinberg | G06V 40/161 340/5.83 |
| 11,854,308 | B1 * | 12/2023 | Marsden | G06V 30/194 |
| 2005/0185835 | A1 * | 8/2005 | Matsugu | G06V 10/449 382/159 |
| 2007/0206941 | A1 * | 9/2007 | Maruyama | G03B 5/00 396/153 |
| 2009/0123077 | A1 * | 5/2009 | Imaoka | G06V 40/172 382/205 |
| 2015/0312595 | A1 * | 10/2015 | Vanam | H04N 19/136 375/240.29 |
| 2018/0191934 | A1 * | 7/2018 | Song | H04N 23/73 |
| 2019/0347469 | A1 * | 11/2019 | Parkkinen | G06V 40/165 |
| 2023/0232026 | A1 * | 7/2023 | Kim | G06V 10/761 |

\* cited by examiner

*Primary Examiner* — Christopher K Peterson
(74) *Attorney, Agent, or Firm* — Volpe Koenig (57) ABSTRACT

A method and apparatus for normalizing an image in an image capturing device includes receiving a processed image by the image device. The processed image is brightness normalized to create a brightness normalized image. The brightness normalized image is provided to an artificial intelligence engine for processing.

20 Claims, 7 Drawing Sheets

FIG. 7

METHOD AND APPARATUS FOR NORMALIZING AN IMAGE IN AN IMAGE CAPTURING DEVICE

BACKGROUND

When an image capturing device captures an image, the image undergoes image processing for display to a user. The image displayed for viewing by a user undergoes image processing to provide an image that is directed at being viewed by the user. However, the image processing that produces an image for viewing by a user may not be usable by an artificial intelligence (AI) engine for performing functions such as facial recognition, object identification, or the like.

BRIEF DESCRIPTION OF THE DRAWINGS

A more detailed understanding can be had from the following description, given by way of example in conjunction with the accompanying drawings wherein.

DETAILED DESCRIPTION

When an image capturing device captures an image through, for example, a lens of the image capturing device, the captured image undergoes image processing prior to being displayed. That is, the viewer of an image in a display of the image capturing device views a processed image that is displayed on a display screen.

In addition, an artificial intelligence (AI) engine may also utilize images captured by the image capturing device in order to perform various functions. For example, the artificial intelligence engine may perform facial recognition. This facial recognition may, for example, be used to unlock features of the image capturing device for a user of the device. Other example uses of the captured image by the artificial intelligence engine may include utilizing the processed image in order to detect scenery, identify an object in the captured image and to classify the captured image.

As will be discussed in further detail below, a lens of the image capturing device captures an image that is then processed by the image capturing device. The image is utilized for both display to a viewer and for use by an artificial intelligence engine. In some cases, depending on the settings of the image capturing device, it may be difficult for the artificial intelligence engine to perform one or more of the functions described above.

For example, in a case where the image capturing device settings include a lower lens exposure, the processed image may be too dark for the artificial intelligence engine to recognize a face in the image, or identify an object, for example. In this case, the artificial intelligence engine may benefit by having the processed image undergo brightness normalization to a degree that allows the artificial intelligence engine to perform the function requested (e.g., facial recognition).

In order to provide an image to the artificial intelligence engine that the artificial intelligence engine may be able to extract the information required, a brightness normalization engine may be utilized in the image capturing device. This brightness normalization engine may be included after the captured image is processed by image processing circuitry in the image capturing device, but before the processed image is provided to the artificial intelligence engine.

Accordingly, discussed herein is a technique for normalizing (e.g., brightness normalizing) a captured image in an image capturing device that has undergone image processing. The technique utilizes, for example, a brightness normalization engine, discussed in more detail below. The brightness normalization engine receives a processed image and normalizes the processed image prior to the image being transferred to the artificial intelligence engine.

A method for normalizing an image in an image capturing device includes receiving a processed image by the image device. The processed image is brightness normalized to create a brightness normalized image. The brightness normalized image is provided to an artificial intelligence engine for processing.

An apparatus for normalizing an image includes a lens and a brightness normalization engine operatively coupled to and in communication with the lens. The brightness normalization engine is configured to receive a processed image from the lens, brightness normalize the processed image to create a brightness normalized image, and provide the brightness normalized image to an artificial intelligence engine for processing.

A non-transitory computer-readable medium for normalizing an image in an image capturing device, the non-transitory computer-readable medium having instructions recorded thereon that, when executed by the processor, cause the processor to perform operations. The operations include receiving a processed image by the image device. The processed image is brightness normalized to create a brightness normalized image. The brightness normalized image is provided to an artificial intelligence engine for processing.

Figure 1:
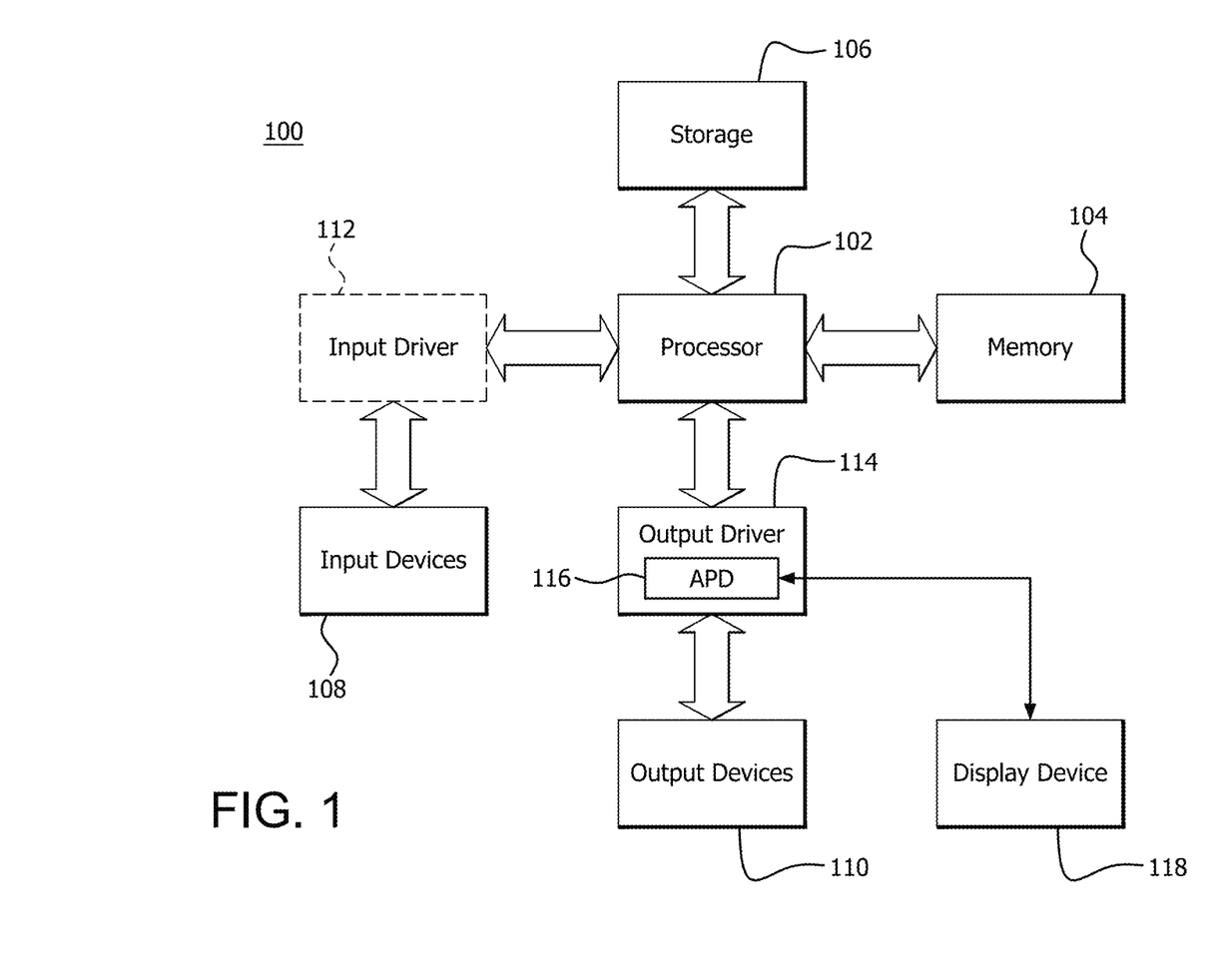
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1. In one example, the device 100 may be an image capturing device 100 having a lens, for example, as the input device 108. Accordingly, hereinafter, the example device 100 may be referred to as image capturing device 100 and input device 108 may be referred to as lens 108.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 may manage an accelerated processing device ("APD") 116 which is coupled to a display device 118. In some examples, the APD 116 is a graphics processing unit ("GPU"). The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein. The APD 116 includes an APD memory 117, which is a general purpose memory used by the units of the APD 116, including the compute units 132, the SIMD units 138, the command processor 136, or other units of the APD 116. The APD memory 117 is separate from the system memory 104. In some examples, the physical addresses of the APD memory 117 are a different address space than the physical addresses of the memory 104. In an example, addresses have numerical address values and a physical memory identifier. The physical memory identifier references the system memory 104 or the APD memory 117. The same numerical memory address can thus refer to either a portion of the system memory 104 or to a portion of the APD memory 117, depending on the physical memory identifier.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116. For virtualization, VMs take turns executing on the processor 102. A switch from one VM to another may be referred to as a "virtualization context switch". Alternatively, each VM may execute on its own dedicated processor.

Figure 2:
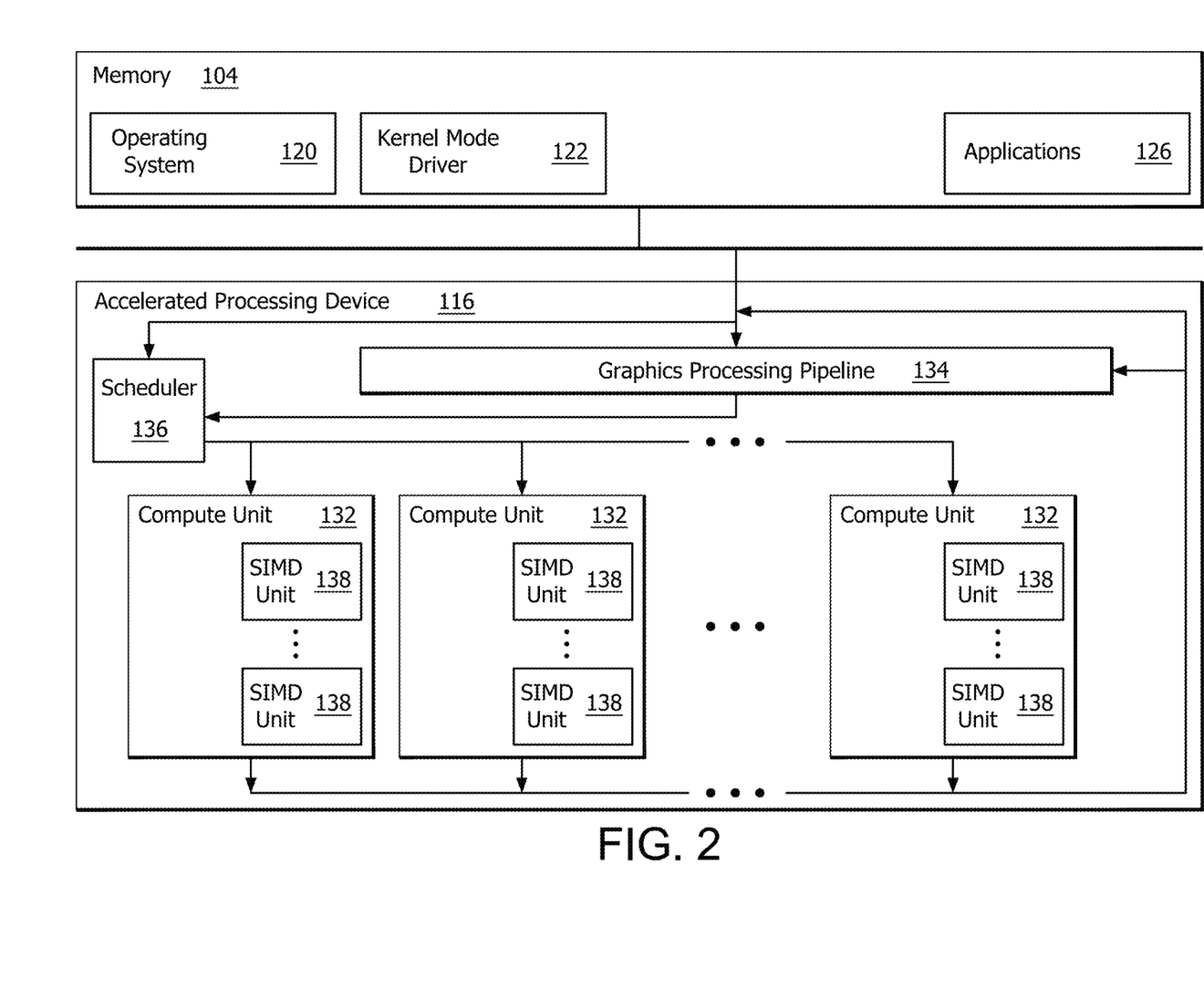
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
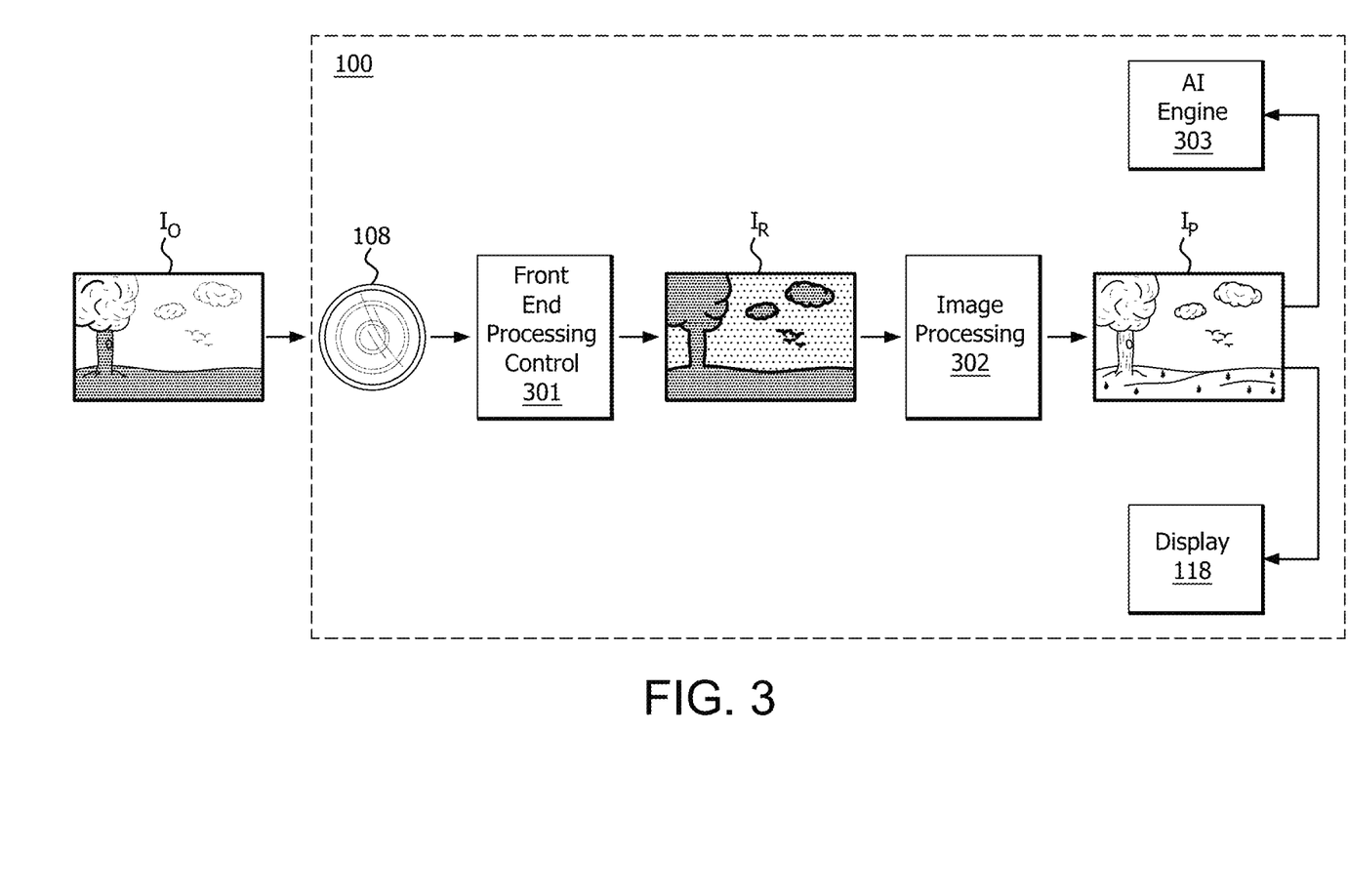
FIG. 3 is a block diagram of an example image capturing device capturing and processing an image, according to an example.

FIG. 3 is a block diagram of an example image capturing device 100 capturing and processing an image, according to an example. The imaging device 100 may include the components described in FIG. 1. In addition, the image processing described below in the image capturing device 100 may be performed by the APD 116 or in the processor 102. The image capturing device 100 may include, for example, a lens 108, front end processing control engine 201, an image processing engine 302, an artificial intelligence engine 303, and a display 118.

The image capturing device 100 includes the lens 108, which captures an original image such as image $I_o$. This original image undergoes front end processing control by the front end processing engine 301 to generate a raw image IR. The front end processing control may be performed by the APD 116 and include, for example, an auto focus function, which utilizes the functionality of the imaging device 100 to automatically focus on a subject in the original image. In addition, the front end processing control may include an auto exposure function, which may set aperture and shutter speed of the image capturing device 100 based on the external lighting conditions.

The raw image is generated from this front end processing control to undergo image processing by the image processing engine 302 as described above by, for example, the APD 116. The image processing may include processing such as demosaicing, shading correction, white balancing, color correction, gamma correction, and noise reduction, for example.

Demosaicing is the process of constructing a full color image from potentially incomplete color samples captured by the lens 108. Shading correction may be utilized to correct for image inconsistency around edges of objects. White balance is utilized to balance color in an image, such as by adding an opposite color to an image object. Color correction may be utilized to balance out the colors in an image to allow them to appear as consistent and close to an original image color as possible. Noise reduction includes removing graininess from an image to clarify the image.

Gamma correction may be utilized to adjust luminance of an image, since a lens (e.g., lens 108) of an image capturing device (e.g., image capturing device 100) may not capture an image in the same manner as a human eye, gamma correction may be utilized to adjust the image's luminance to be more visually acceptable to the human eye.

Therefore, once the raw image has undergone image processing 302, a processed image $I_p$ is the resultant image. The processed image that is generated as a result of the image processing is in the nonlinear domain for display to a user, for example. The human eye perceives images in the nonlinear domain, where an image exists as closely to a natural state as can be perceived. Additionally, since an artificial intelligence engine (e.g., AI engine 303) in the context of image perception is to perceive an image in the same way as the human eye, the artificial intelligence engine also perceives an image in the nonlinear domain. The processed image may then be provided to the display 118 for viewing by a user of the image capturing device 100 as well as to an artificial intelligence engine 303, which may be executing on the APD 116 or the processor 102.

Figure 4:
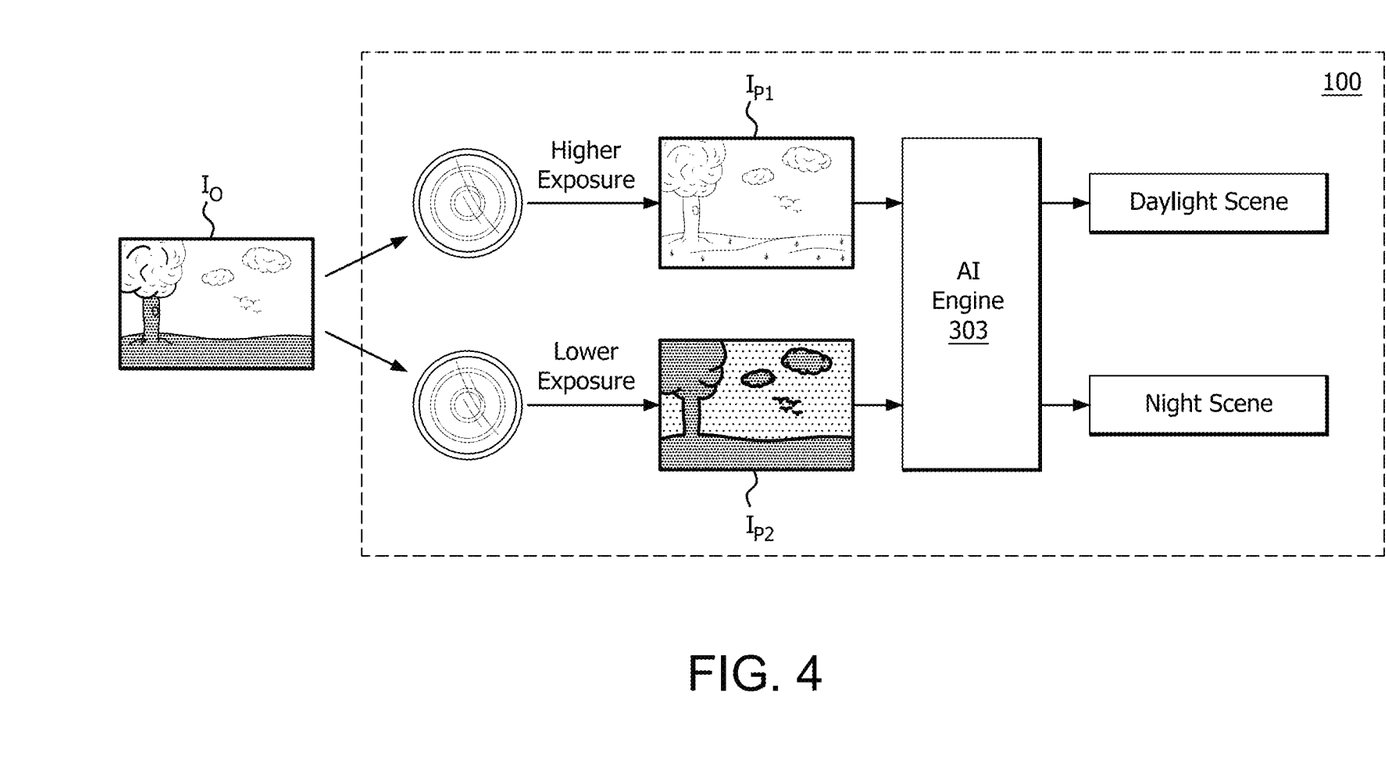
FIG. 4 is a block diagram of an example image capturing device capturing and processing an image with different exposure settings, according to an example.

FIG. 4 is a block diagram of an example image capturing device 100 capturing and processing an image with different exposure settings, according to an example. That is, the image capturing device 100 may include different exposure settings which may cause the eventual processed image to appear differently depending on the setting. These exposure settings may include the aperture (e.g., lens width), the shutter speed, and the ISO value, which relates to light sensitivity and film speed in a film camera.

Capturing an image such as original image $I_O$ at a higher exposure setting results in a processed image that may be brighter such as processed image $I_{P1}$, while capturing an image with a lower exposure setting results in a processed image that may be darker, such as shown by processed image 42. When either of these processed images are processed by the artificial intelligence engine 303, they are perceived differently based upon the exposure settings. For example, processed image $I_{P1}$ may be perceived as a daylight scene, while processed image $I_{P2}$ may be perceived as a night scene.

As mentioned above, the artificial intelligence engine 303 may have difficulty performing the processing functions based upon how the processed image is perceived by the artificial intelligence engine 303. For example, the artificial intelligence engine 303 may not be able to properly identify an object or recognize a face in processed image $I_{P2}$ due to the perception of that image as a night image. As mentioned above, this difficulty may affect the functionality of the artificial intelligence engine 303 performing the operations required.

Accordingly, as discussed above, it may be desirable to perform a brightness normalization on the processed image prior to the artificial intelligence engine 303 receiving the processed image.

Figure 5:
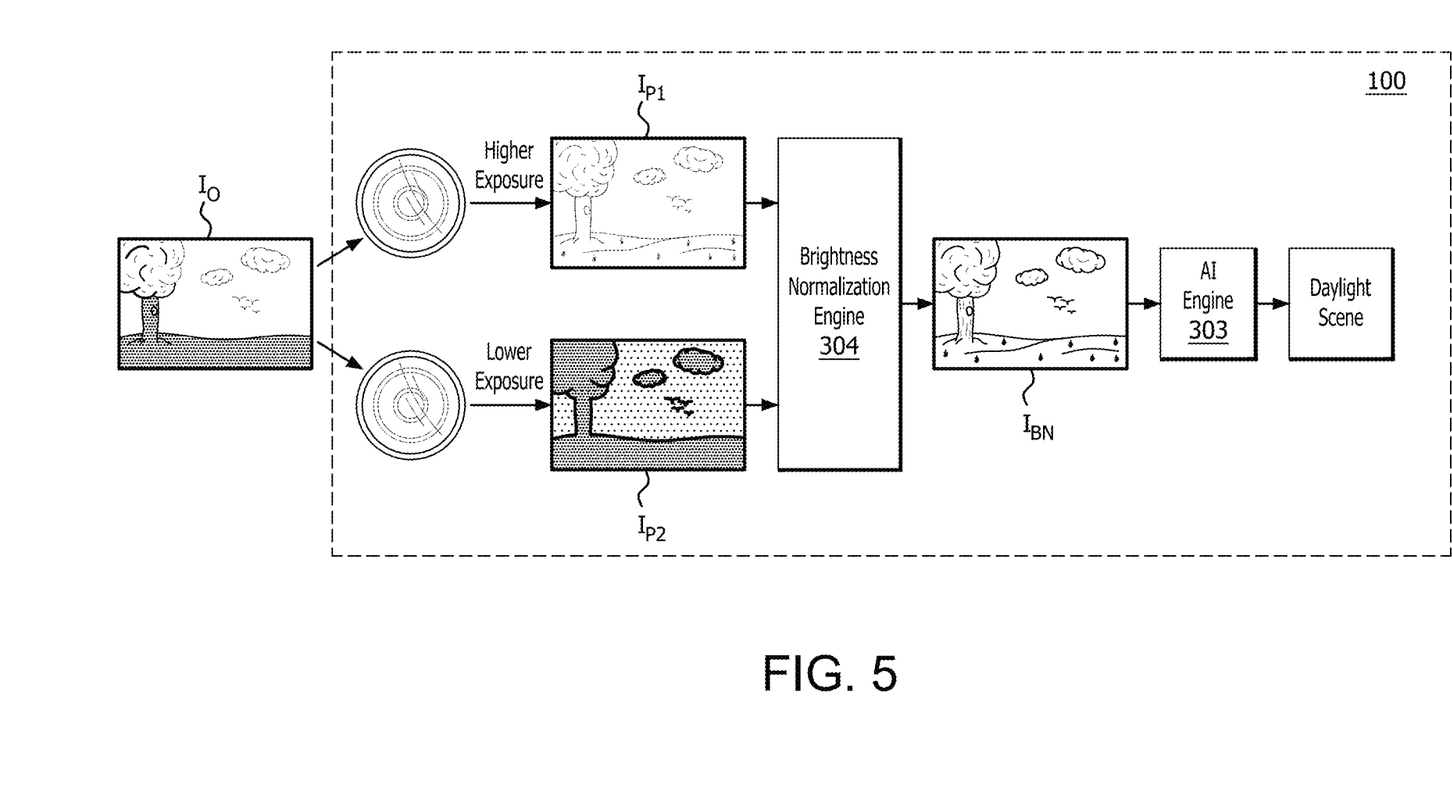
FIG. 5 is a block diagram of an example image capturing device capturing, processing and normalizing an image, according to an example.

FIG. 5 is a block diagram of an example image capturing device 100 capturing, processing and normalizing an image, according to an example. As shown in FIG. 5, the original image is captured by a lens (e.g., lens 108) of the image capturing device 100. Similar to the processing in FIG. 4, a brighter processed image ($I_{P1}$) is produced with higher exposure settings while a darker processed image ($I_{P2}$) is produced with lower exposure settings.

However, prior to the processed image (e.g., $I_{P1}$ or $I_{P2}$) being provided to the artificial intelligence engine 303, the processed image undergoes brightness normalization by a brightness normalization engine 304 (discussed in further detail below) in the image capturing device 100. The brightness normalization engine 304 may be in the form of circuitry, hardware, or software executing on a processor, and may be performed by the APD 116 or the processor 102.

The output of the brightness normalization engine 304 is a brightness normalized image IBN which is then processed by the artificial intelligence engine 303. As shown in FIG. 5, the brightness normalization engine 304 normalizes the processed image and generates as an output an image that has its brightness normalized so that the artificial intelligence engine 303 is able to perform functions. For example, by normalizing the brightness of the processed image, the artificial intelligence engine 303 may be able to perceive the brightness normalized image as a daylight scene. In this case, it may be easier for the artificial intelligence engine 303 to perform a function such as facial recognition, object identification, or the like.

As will be explained further below, the brightness normalization engine 304 performs the normalization by normalizing the effects of the setting values of the image capturing device 100 such as the aperture value (AV), time value (TV), speed value (SV) and by introducing a brightness value (BV) into the processed image. The normalization allows the brightness normalization engine 304 to adjust the brightness of the processed image to a degree that allows the artificial intelligence engine 303 to perceive the image in such a way to allow the artificial intelligence engine 303 to perform desired functions.

More specifically, normalization occurs by "canceling out" the effects of the camera settings (AV, TV, SV) so that all images that have been normalized are as if the images were taken with the same camera settings. This normalization is performed by multiplying the brightness of the pixels of the image by brightness adjustments that are based on the actual camera settings used for aperture, shutter speed, and gain (ISO or film speed). These adjustments counteract or cancel the effects of these camera settings, resulting in an image having a brightness that would occur if a single, uniform set of camera settings were used for all images.

A brightness value BV is used as a fixed adjustment to such uniform camera settings, and allows for a calibration to a particular brightness that an artificial intelligence model might be expecting. By adjusting all images to have a brightness as if such images were taken with the same camera settings, the artificial intelligence model is provided with images having uniform brightness, which means that the artificial intelligence model does not need to compensate for varying brightness levels based on camera settings.

Figure 6:
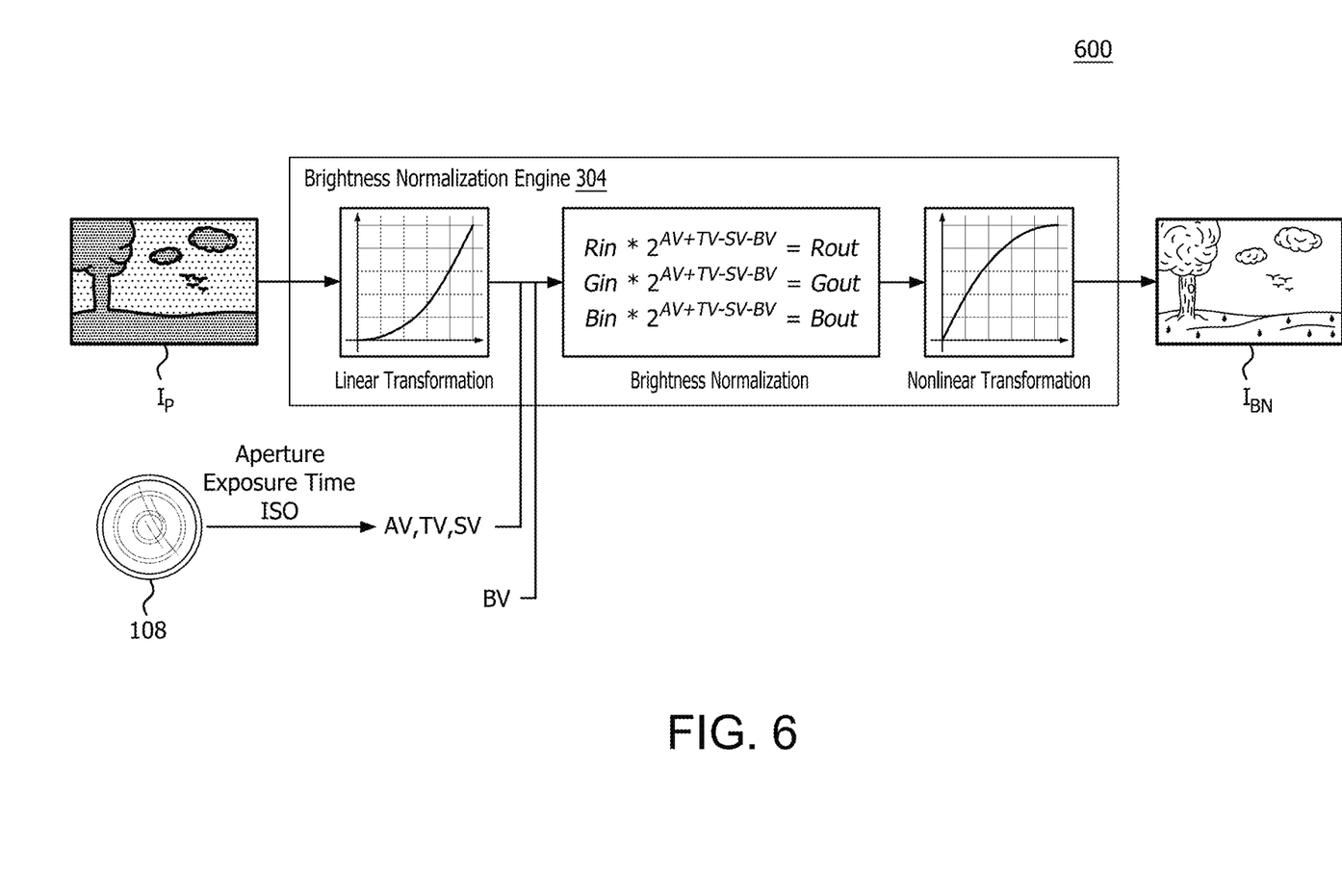
FIG. 6 is an exploded block diagram of an example brightness normalization engine of the example device of FIG. 5.

FIG. 6 is an exploded block diagram 600 of an example brightness normalization engine 304 of the example device of FIG. 5. As shown in FIG. 6, and as will be described in further detail, the brightness normalization engine 304 performs a linear transformation on the processed image ($I_P$) as normalization is performed mathematically in the linear domain, performs brightness normalization on the processed image in the linear domain, and then transforms the brightness normalized image back into the nonlinear domain for processing by the artificial intelligence engine 303 as the brightness normalized image IBN. Since the artificial intelligence engine 303 is effectively viewing the image as closely analogous to the human eye as possible, the image is converted back into the nonlinear domain for perceiving by the artificial intelligence engine 303.

Equation 1 performs brightness normalization based on camera settings in the following manner. Each red, green, and blue component (e.g., $R_{in}$, $G_{in}$, $B_{in}$) is multiplied by 2 to an exponent based on camera settings AV, TV, and SV. For each such component, the illustrated formula is equivalent to component $2^{AV}*2^{TV}/(2^{SV}*2^{BV})$. As shown in table 1, the aperture value increases as the actual aperture size of the camera decreases.

For example, at f/1.4, an aperture value of 1 is used, while at f/2.8, an aperture value of 3 is used. In camera, a decreasing aperture size lets in less light, reducing brightness of the captured image. Each aperture value listed in table 1 represents a two-fold decrease in light let in, so that f/1.4 lets in twice as much light as f/2.0. Thus, each aperture value shown can be viewed as an integer exponent of two decrease to the brightness let in by the camera.

To counteract the effects of reducing the aperture size (e.g., an increase in f-number), and normalize pixel brightness for aperture, the brightness of a component (e.g., red) is thus increased by 2 raised to the aperture value. In other words, because an increase in f-number decreases brightness by $\frac{1}{2}^{AV}$, multiplying by $2^{AV}$ counteracts this effect, increasing the brightness by an amount equal to the reduction in brightness due to aperture setting.

A similar effect occurs with the time value (e.g., shutter speed) and "speed value" (also referred to as, e.g., ISO (an acronym referring to the "international organization for standardization," which set the ISO standard for film speed), film speed, or gain). For shutter speed (TV), an increasing TV value is associated with a faster shutter speed and thus a smaller amount of light being captured by the camera. Each increase in TV setting is associated with a halving of the light captured by the camera.

Thus, multiplying by $2^{TV}$ results in counteracting the effect of shutter speed by increasing the brightness by the amount reduced by the shutter speed setting. A similar effect occurs with speed value (e.g., ISO, film speed, or gain), but that effect is numerically reversed. Specifically, as ISO increases, brightness also increases rather than decreases. Thus, dividing by $2^{SV}$ adjusts for the increase associated with ISO.

Due to the above, it can be seen that multiplying the brightness value by 2 raised to the exponents related to AV, TV, and SV brings the image to a brightness that would occur if camera settings f/1.0, 100 shutter speed, and 3.125 ISO were used. An additional factor BV is used to adjust the absolute brightness to some setting appropriate for the artificial intelligence network. The BV value can be any technically feasible value, or could be unused. Any technically feasible manner for selecting BV is possible.

As can be seen, normalization occurs by counteracting the effects of the camera settings, to achieve uniform brightness across different image and, optionally, applying an additional brightness adjustment using BV. Although a specific mathematical formula is described, any other technique for performing normalization could be used. Such technique could counteract the effects of the camera settings and the brightness of the images to values that would occur if the images were captured with the same camera settings. This technique thus eliminates the need for the artificial intelligence network to be able to compensate for or otherwise discriminate or recognize camera settings.

The brightness normalization engine 304 utilizes the settings of the image capturing device 100 as described above along with the introduction of the brightness value adjustment factor in order to normalize the processed image. The normalization is performed by normalizing the AV, TV, SV and BV settings for the red, green and blue color values of the processed image. That is, normalization is performed on each input color value using the AV, TV, SV and BV values to produce a normalized output color value for that color. The brightness normalization may be performed in accordance with the following equation:

$$Rin*2^{AV+TV-SV-BV}=Rout$$

$$Gin*2^{AV+TV-SV-BV}=Gout,$$

$$Bin*2^{AV+TV-SV-BV}=Bout \quad \text{Equation (1)}$$

where Rin, Gin, and Bin are the input red, green and blue color values of the image, respectively, AV is an aperture value related to the aperture setting of the image capturing device 100, TV is the time value related to the exposure setting of the image capturing device 100, SV is the speed value related to the ISO setting of the image capturing device 100, BV is the predefined brightness value to normalize the processed image, and Rout, Gout, and Bout are the normalized red, green and blue color output values of the brightness normalized image.

As shown in FIG. 6, the values AV, TV and SV may be received from the control settings in the image capturing device 100 as the original image is captured by the lens 108. The brightness value may be a set predefined value stored in memory in the image capturing device 100. The brightness value may be configured in the image capturing device 100 in order to provide a normalization adjustment that will adjust the processed image to allow for the artificial intelligence engine 303 to perceive the brightness normalized image that allows it to effectively perform the desired functions.

In one example, the brightness value may be equal to ten (10). That is BV=10. This value may be related to a brightness value that is between a dark room and a bright sunny day. For example, the nominal brightness value of a dark room may be BV=−5, while the brightness value of a bright sunny day may have a BV=12. Accordingly, a BV of 10 may be indicative of a bright day. However, these brightness values are exemplary and any value for BV may be utilized as the brightness value for normalization in the image capturing device 100.

With regard to the values AV, TV and SV, as mentioned above, they may be received from the settings in the control settings as the original image is captured by the lens 108. They may be also stored in a table that is in a memory of the image capturing device 100. Further, as mentioned above the values relate to the exposure settings of the image capturing device. For example, the values of AV, TV, and SV may relate to their respective exposure values in accordance with the below table.

TABLE 1

| Aperture Value (Av) | Aperture | Time Value (Tv) | Exposure time | Speed Value (Sv) | Film speed (ISO) |
|---|---|---|---|---|---|
| 0 | f/1.0 | 0 | 1 | 0 | 3.125 [3] |
| 1 | f/1.4 | 1 | ½ | 1 | 6.25 [6] |
| 2 | f/2.0 | 2 | ¼ | 2 | 12.5 [12] |
| 3 | f/2.8 | 3 | ⅛ | 3 | 25 |
| 4 | f/4.0 | 4 | 1/16 [1/15] | 4 | 50 |
| 5 | f/5.6 | 5 | 1/32 [1/30] | 5 | 100 |
| 8 | f/8.0 | 6 | 1/64 [1/60] | 6 | 200 |
| 7 | f/11 | 7 | 1/128 [1/125] | 7 | 400 |
| 8 | f/16 | 8 | 1/256 [1/250] | 8 | 800 |
| 9 | f/22 | 9 | 1/512 [1/500] | 9 | 1600 |
| 10 | f/32 | 10 | 1/1024 [1/1000] | 10 | 3200 |

Accordingly, by using the predefined brightness value and the above values for AV, TV and SV, a brightness normalized image may be generated by utilizing, for example, Equation 1 above.

Figure 7:
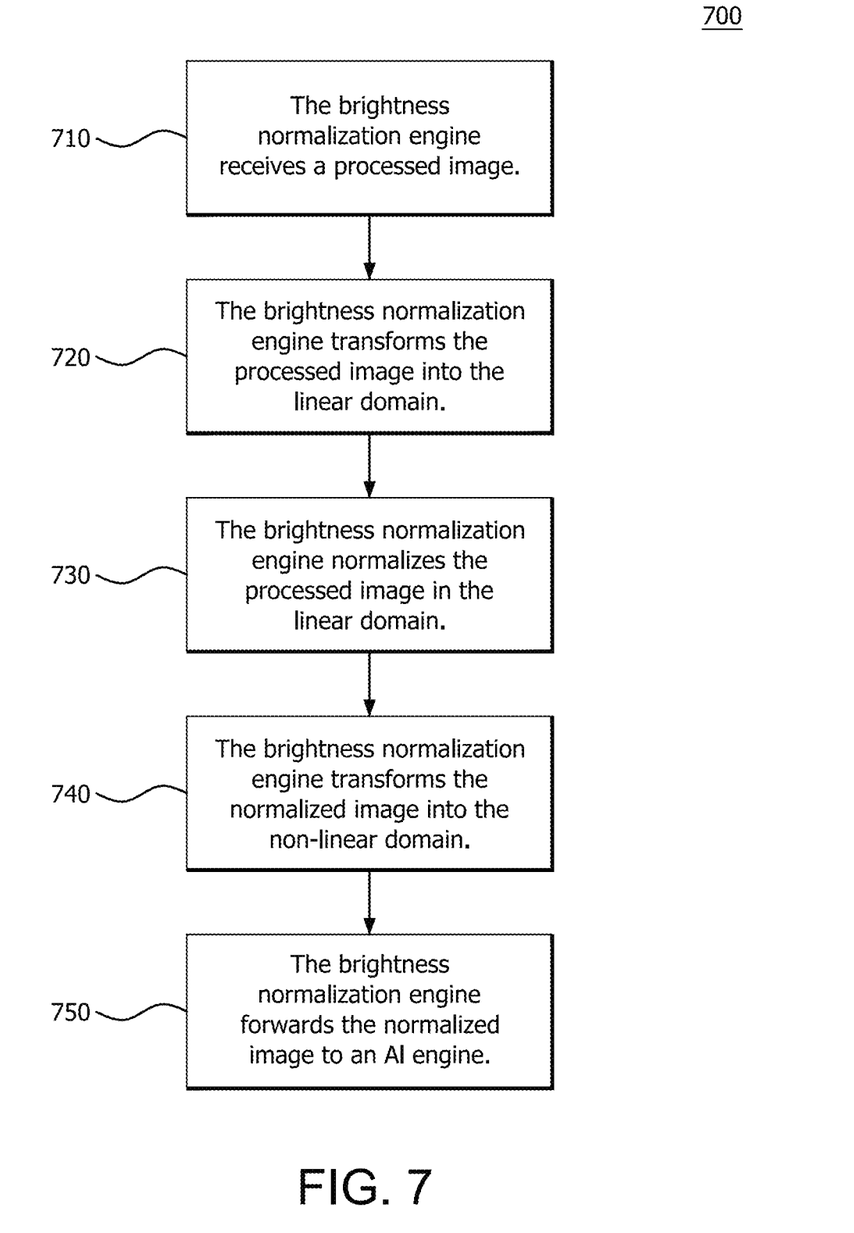
FIG. 7 is a flow diagram of an example method of processing and normalizing an image, according to an example.

FIG. 7 is a flow diagram of an example method 700 of processing and normalizing an image, according to an example. In step 710, the brightness normalization engine (e.g., brightness normalization engine 304) receives a processed image. For example, referring back to FIGS. 3 and 6, the brightness normalization engine receives the processed image from the image processing element 302.

Since the processed image generated by the image processing process described in FIG. 3 is in the nonlinear domain, the brightness normalization engine transforms the processed image into the linear domain for normalization (step 720). Once the processed image is transformed into the linear domain, the processed image may be normalized.

Accordingly, in step 730, the brightness normalization engine normalizes the processed image in the linear domain. For example, the brightness normalization engine utilizes the AV, TV and SV values from the settings of the image capturing device 100 as well as the predefined brightness value and performs brightness normalization. In one example, this is performed by introducing the AV, TV, SV and BV values into Equation 1 to normalize the input red, green and blue color values to achieve desired output red, green and blue color values.

Once the processed image in normalized in the linear domain, the brightness normalization engine transforms the brightness normalized image into the nonlinear domain (step 740). At this stage, two separate nonlinear domain images may exist, the processed image prior to normalization and the brightness normalized image. The processed image prior to normalization may be provided to the display (e.g., display 118) for a viewer to observe while the brightness normalized image may be provided to the artificial intelligence engine for processing (step 750). Accordingly, the brightness normalization engine forwards the brightness normalized image to the artificial intelligence engine for processing.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the memory controller 141, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for normalizing an image in an image capturing device, comprising:
    receiving a processed image by the image capturing device;
    normalizing a brightness of the processed image to counteract effects of exposure settings on the image capturing device and to generate a brightness normalized image, wherein the normalizing comprises adjusting brightness of the image to correspond to a fixed set of camera settings regardless of image content; and
    providing the brightness normalized image to an artificial intelligence engine for processing.
2. The method of claim 1 wherein the processed image is received in a non-linear domain.
3. The method of claim 2, further comprising transforming the processed image into a linear domain.
4. The method of claim 3, further comprising transforming the brightness normalized image in the linear domain to create the brightness normalized image in the non-linear domain for providing to the artificial intelligence engine for processing.
5. The method of claim 1 wherein the brightness normalizing the processed image includes normalizing control settings of the image capturing device.
6. The method of claim 5 wherein the control settings of the image capturing device include one or more of the following: an aperture value, a time value, a speed value, and a brightness value.
7. The method of claim 6 wherein the normalizing control settings of the image capturing device includes normalizing the aperture value, time value, speed value and brightness value for each of a red, green and blue color value in the processed image.
8. The method of claim 7, further comprising generating a normalized red, green and blue output image as the brightness normalized image.
9. The method of claim 1 wherein the normalizing is performed by a brightness normalization circuit.
10. The method of claim 1 wherein the artificial intelligence engine performs object identification on the brightness normalized image.
11. An apparatus for normalizing an image, comprising:
    a lens; and
    a brightness normalization engine operatively coupled to and in communication with the lens, the brightness normalization engine configured to:
    receive a processed image from the lens;
    normalize a brightness of the processed image to counteract effects of exposure settings on an image capturing device and to create a brightness normalized image, wherein the normalizing comprises adjusting brightness of the image to correspond to a fixed set of camera settings regardless of image content; and
    provide the brightness normalized image to an artificial intelligence engine for processing.
12. The apparatus of claim 11 wherein the processed image is received in a non-linear domain.
13. The apparatus of claim 12, wherein the brightness normalization engine is further configured to transform the processed image into a linear domain.
14. The apparatus of claim 13, wherein the brightness normalization engine is further configured to transform the brightness normalized image in the linear domain to create the brightness normalized image in the non-linear domain for providing to the artificial intelligence engine for processing.
15. The apparatus of claim 11 wherein the brightness normalization engine is further configured to normalize control settings of the image capturing device.
16. The apparatus of claim 15 wherein the control settings of the image capturing device include one or more of the following: an aperture value, a time value, a speed value, and a brightness value.
17. The apparatus of claim 16 wherein the brightness normalization engine is further configured to normalize the aperture value, time value, speed value and brightness value for each of a red, green and blue color value in the processed image.
18. The apparatus of claim 17 wherein the brightness normalization engine is further configured to generate a normalized red, green and blue output image as the brightness normalized image.

19. The apparatus of claim 11 wherein the brightness normalization engine includes a brightness normalization circuit.

20. A non-transitory computer-readable medium for normalizing an image in an image capturing device, the non-transitory computer-readable medium having instructions recorded thereon that, when executed by a processor, cause the processor to perform operations including:
receiving a processed image by the image capturing device;
normalizing a brightness of the processed image to counteract effects of exposure settings on the image capturing device and to generate a brightness normalized image, wherein the normalizing comprises adjusting brightness of the image to correspond to a fixed set of camera settings regardless of image content; and
providing the brightness normalized image to an artificial intelligence engine for processing.

\* \* \* \* \*